United States Patent [19]

Leclere et al.

[11] Patent Number: 5,100,493

[45] Date of Patent: Mar. 31, 1992

[54] PROCESS FOR LAMINATING A GLASS OR PLASTIC SHEET WITH A FLEXIBLE FILM

[75] Inventors: Klemens Leclere, Neu Moresnet, Belgium; Hans-Willi Kessels; Friedhelm Hammes, both of Herzogenrath, Fed. Rep. of Germany

[73] Assignee: Saint-Gobain Vitrage, Courbevoie, France

[21] Appl. No.: 630,732

[22] Filed: Dec. 20, 1990

Related U.S. Application Data

[63] Continuation of Ser. No. 279,063, Dec. 2, 1988, abandoned.

[30] Foreign Application Priority Data

Dec. 2, 1987 [DE] Fed. Rep. of Germany ....... 3740875

[51] Int. Cl.$^5$ ...................... B32B 31/04; B32B 31/10
[52] U.S. Cl. ...................... 156/285; 156/286
[58] Field of Search ............. 156/382, 285, 324, 87, 156/484, 485, 574, 579, 102, 286, 104; 239/602, DIG. 19; 15/415.1, 414; 406/152

[56] References Cited

U.S. PATENT DOCUMENTS

| | | | |
|---|---|---|---|
| 2,429,123 | 10/1947 | Crowley | 156/286 X |
| 3,256,648 | 6/1966 | Subonovich | 15/415 R |
| 4,100,011 | 6/1978 | Foote | 156/286 |
| 4,264,400 | 4/1981 | Breitmar | 156/285 X |
| 4,432,828 | 2/1984 | Siempelkamp et al. | 156/286 X |
| 4,553,284 | 11/1985 | Strumbos | 15/415 R |
| 4,707,208 | 11/1987 | Crumbach et al. | 156/285 |

Primary Examiner—Michael W. Ball
Assistant Examiner—Michele K. Yoder
Attorney, Agent, or Firm—Oblon, Spivak, McClelland, Maier & Neustadt

[57] ABSTRACT

For coating a glass sheet (1) with a flexible transparent film (2) glass sheet (1) and film (2) are brought together at an acute angle α and are continuously moved together. In the area ahead of the contact of film (2) with glass sheet (1) a continuously movable hollow space (8) is created with the help of a slot nozzle (3) which is in sliding contact on the one side with glass sheet (1) and on the other side with film (2). Air is continuously sucked from this hollow space (8) with the help of slot nozzle (3). By the resulting pressure difference acting on film (2), film (2) is preliminarily bonded to glass sheet (1). This preliminary bonding is followed by a final bonding by use of increased temperature and increased pressure.

4 Claims, 3 Drawing Sheets

PROCESS FOR LAMINATING A GLASS OR PLASTIC SHEET WITH A FLEXIBLE FILM

This application is a continuation of application Ser. No. 279,063, filed on Dec. 2, 1988, now abandoned.

BACKGROUND OF THE INVENTION

1. Field of the Invention

The invention relates to a process for coating a glass sheet with a flexible film, in which the glass sheet and the film are brought together at an acute angle and are continuously moved, and by use of pressure along the contact line of film and glass sheet the film is preliminarily bonded to the glass sheet by removal of air, and the preliminarily bonded coating arrangement is finally bonded to one another by use of increased temperature and increased pressure. The phrase "glass sheets" is understood to mean transparent plates or sheets made of silicate glass or a plastic, for example, of polycarbonate. In this case, they can be monolithic plates or multilayer plates, for example, laminated glass sheets made from glass and plastic layers.

2. Discussion of the Background

It is known to coat glass sheets on one surface with a flexible plastic film. The plastic films can have different properties and be used for different purposes. For example, the flexible film can be used as splinterproof film in the case of silicate glass sheets. Such splinterproof films are calender-coated onto the inside of motor vehicle windshields. They keep the passengers from coming in contact with the glass splinters in case of an collision. In the case of plates or sheets made from plastic the flexible films can perform the function of a layer for increasing scratch resistance.

Different processes are known for calender-coating plastic sheets onto glass sheets. If a thermoplastic film is involved, or if the film is provided with a thermoplastic adhesive layer on the side to be bonded to the glass sheet, the coating process generally takes place in two steps: in the first step a preliminary bonding is performed while avoiding the inclusion of air, and in the second step the final bonding takes place by using increased temperature and increased pressure, for example, in a pressure autoclave.

Application of the flexible film and the preliminary bonding can take place according to the prior art with the help of a rolling process as, for example, is described in European patent 0 015 209. In this case, the glass sheet, which is to be coated, together with the film, passes between rolls, and a continuous web of the film is introduced at an acute angle to the glass sheet into the nip of a rolling device and is calender-coated on the glass sheet. This process has proved successful but requires the existence of a comparatively extensive rolling device.

It is also known to perform the preliminary bonding of the film and glass sheet so that the layer arrangement consisting of the glass sheet and film is put in a closed container and the latter is evacuated. Such a process is described, for example, in DE-PS 24 24 085. But this known process does not allow any continuous production operation.

SUMMARY OF THE INVENTION

The object of the invention is to provide a process for preliminary bonding of a flexible film to a glass sheet, which, on the one hand, allows a continuous work flow and, on the other hand, can be performed without a special rolling device. This object is achieved according to the invention in that a continuously movable hollow space is created in the area ahead of the contact of the film with the glass sheet by sliding contact of a spacer, extending crosswise to the direction of movement of the glass sheet, on the one hand with the glass surface and, on the other hand, with the film, a hollow space limited by the film, the glass sheet and the spacer, and air is continuously sucked from this hollow space.

In the process according to the invention the prebonding of the film to the glass sheet takes place like a vacuum process, but continuously, so that the process can be integrated in a continuous production process. The bubble-free pressing of the film onto the glass sheet takes place by the pressure difference, which acts on the film as a result of the partial vacuum produced by the suction, outside the hollow space put under partial vacuum by the suction process immediately before the contact line between the film and glass sheet. The level of the partial vacuum, i.e. the suction volume stream, as well as the configuration of the surfaces of the spacer in contact with the glass sheet and film in this case is to be selected so that, the sliding relative movement is made possible despite the active friction forces between the spacer, on the one hand, and the film and glass sheet, on the other hand.

Advantageously, sucking the air from the hollow space between the film and glass sheet takes place with the help of one or more slot nozzles, which, as such, form the spacer with their outside surfaces.

If glass sheets are involved that are plane or are bent only in one direction, i.e., cylindrically bent, which is to be coated with the film, a plane and rigid slot nozzle can be used. Also a rigid slot nozzle can be used for bent glass sheets, if the slot nozzle is shaped to correspond to the shape of the glass sheets.

In addition, in a suitable further development of the invention for coating of bent glass sheets, slot nozzles can be used, which are made of rubber-elastic material and which adapt to the shape of the glass sheet under the effect of the forces exerted by the pressure difference. Advantageously, the nozzle exhibits an elastic deformability also in the direction of the slot plane, so that, in the case of a three-dimensional curvature of the contact line between film and glass sheet, it can optimally adapt to the course of the curved contact line.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
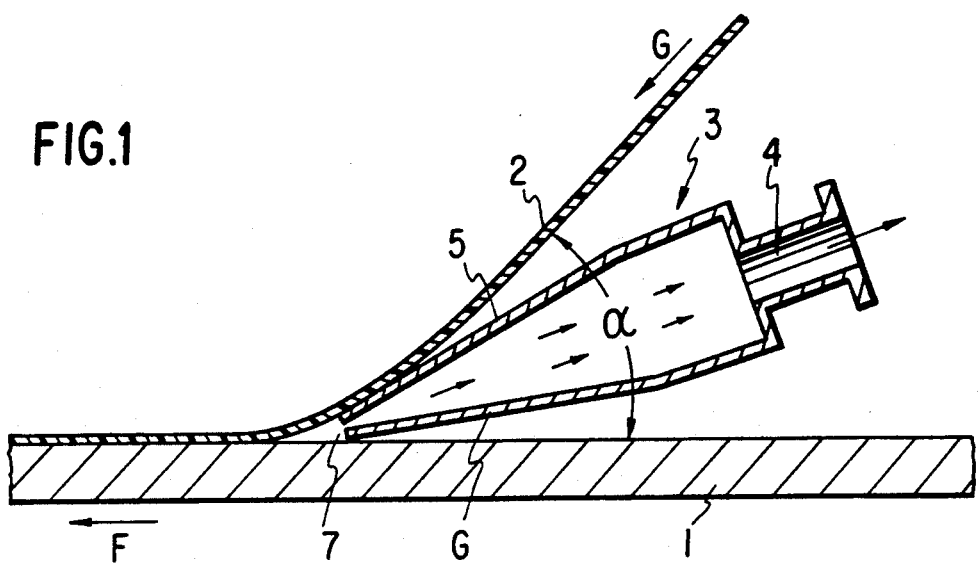
FIG. 1 is a vertical section through a glass sheet and a film during the coating process with the help of a rigid slot nozzle.
Figure 2:
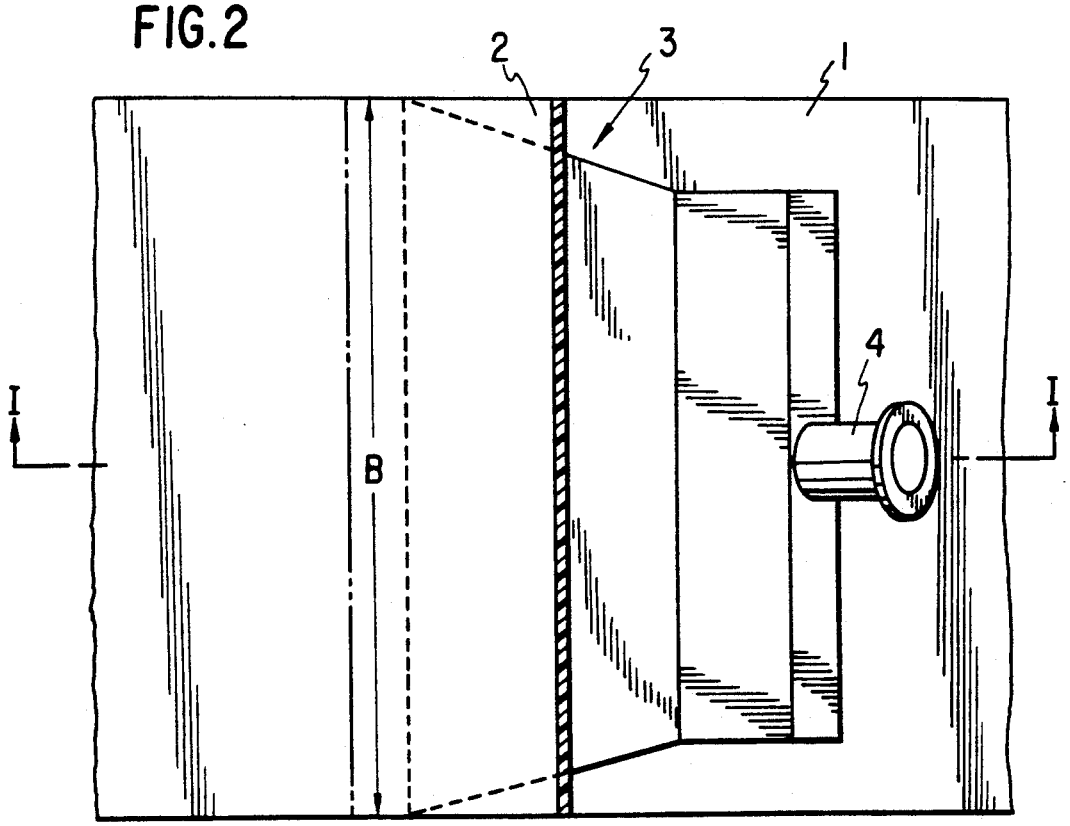
FIG. 2 shows arrangement shown in FIG. 1, in a top view.

In the drawings, glass sheet 1, which is coated on one of its surfaces with a flexible plastic film 2, is represented as a monolithic glass sheet. But, of course, glass sheet 1, as already mentioned above, can be a multilayer glass sheet, for example, a customary laminated safety glass sheet, as used for motor vehicle windshields. Also in the case of flexible film 2, different materials can be involved. For example, film 2 can be a transparent film made from a highly elastic polyurethane, which is provided with a thermoplastic polyurethane layer on the side to be bent on the glass sheet. Film 2 can be also, for example, a transparent sheet having one layer of a highly elastic polyurethane, such a thermoset polyurethane, and one layer of a polyurethane having energy-absorbing properties.

Such films and sheets are described, for example, in DE-PS 26 29 779 and in European Patent Publication EP-0 133 090.

Glass sheet 1 can be moved on a conveying device (not shown), which, for example, can consist of a conveyor belt, in the direction of arrow F. Film 2, with which the glass sheet is coated, is mounted above the conveying device, as a rolled-up film web so that it is unrolled as a continuous film web from the roll and is guided in the direction of arrow G at an acute angle $\alpha$ to glass sheet 1. The rolled-up film web, the means for rotating support of the film roll and the devices for guiding the film web are customary devices and for better overall view are not represented.

A slot nozzle 3 is placed in the space, which is formed by glass sheet 1 and film 2 reaching glass sheet 2 at angle $\alpha$. Slot nozzle 3 is connected by a connector 4 and by a pipe (not shown) to a suction pump (also not shown). Looked at in cross section, the slot nozzle exhibits two walls 5, 6 running together conically, which on the end form nozzle orifice 7. Air is continuously sucked from space 8 through nozzle orifice 7, so that a partial vacuum is created in space 8. By this partial vacuum or by the atmospheric excess pressure, produced as a result, above film 2, the latter is pressed against wall 5 of the slot nozzle and fits tightly on this wall 5. Also by the pressure difference produced by the suction action, the front end of wall 6 of slot nozzle 3 is pressed on the surface of glass sheet 1, so that an air sealing effect or at least an air sealing effect to a large extent is produced between nozzle wall 6 and the surface of glass sheet 1 along the contact line. Optionally wall 6 in its front end area, with which it slides over the surface of the glass sheet, is provided with an elastic layer, by which the tight contact of the nozzle lips on the glass surface is promoted. Also on the outside of nozzle wall 5 in the area of the nozzle lip, along which film 2 slides, a suitable layer can be applied, which reduces the coefficient of friction between the film and the nozzle lip and which also has a favorable effect on the air-sealing contact between the nozzle lip and the film.

In the area of nozzle orifice 7 slot nozzle 3 has a width B, which corresponds to the desired width of the coated glass sheet. In the case represented, slot nozzle 3 in the area of the nozzle orifice is exactly as wide as glass sheet 1 and film 2 but glass sheet 1 and film 2 can also be of different widths. Also width B of slot nozzle 3 can be greater or smaller than the width of film 2 and/or glass sheet 1, without the performance of the process according to the invention being substantially adversely affected.

If cylindrically or spherically bent glass sheets are to be coated with a film, a slot nozzle is used for sucking the air, which is sufficiently flexible to adapt to the course of curvature that the line takes, along which the contact of the film with the glass sheet takes place. Depending on the shape of the glass sheet, this line can also be bent in two dimensions, so that the slot nozzle must allow elastic deformation in two directions.

Figure 3:
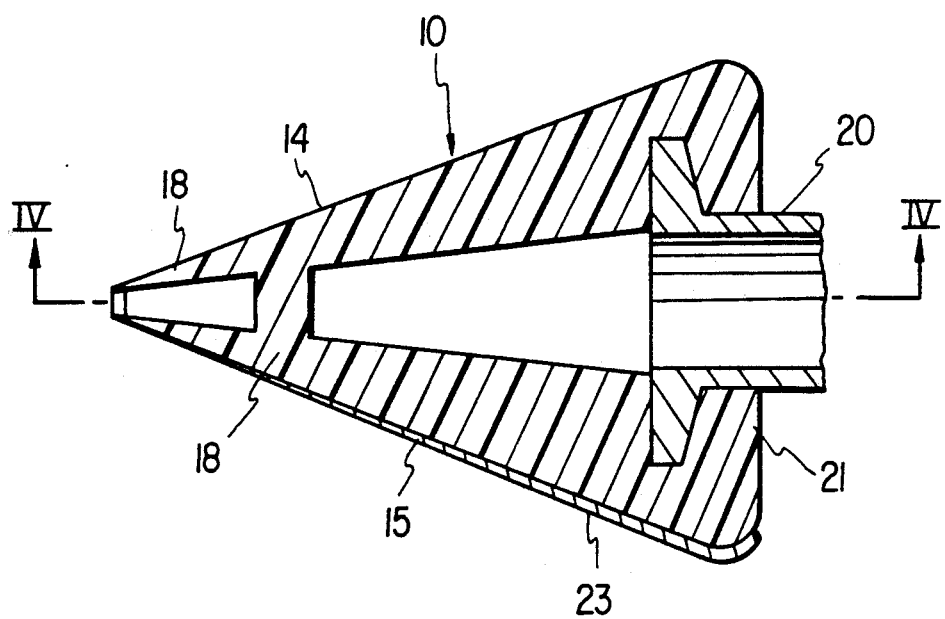
FIG. 3 shows a slot nozzle-suction nozzle made of elastically deformable material in a vertical cross section taken along line III—III in FIG. 4.
Figure 4:
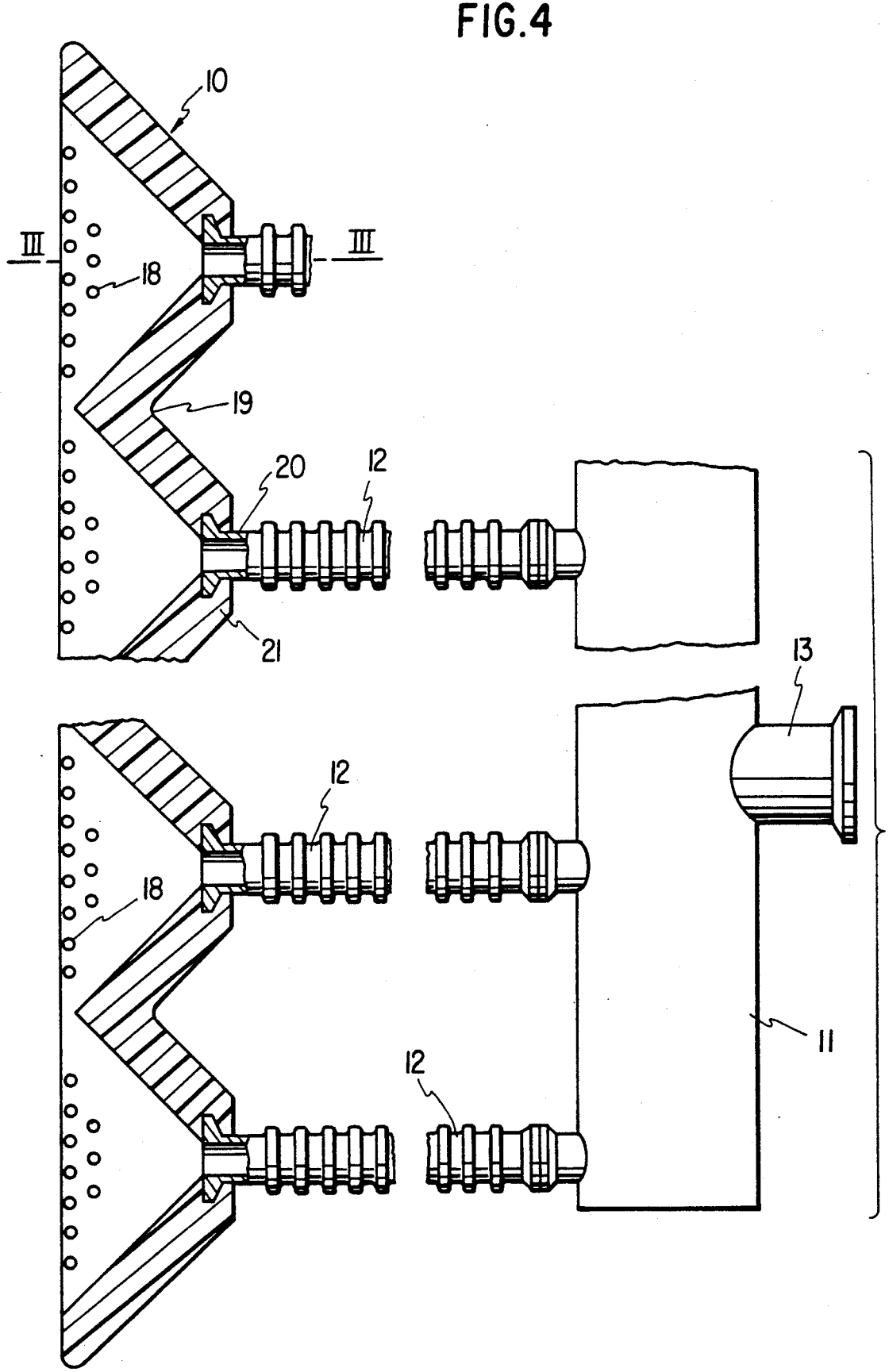
FIG. 4 shows the slot nozzle suction nozzle represented in FIG. 3, as sectional representation taken along line IV—IV.

An embodiment of such a suction nozzle which makes possible an elastic deformation in two dimensions, is represented in FIG. 3 and 4. This suction nozzle consists of actual nozzle body 10 made of flexible material, for example, of rubber-elastic elastomer, a rigid manifold 11 and elastically deformable corrugated hose 12, which produce the connection between manifold 11 and nozzle body 10. Manifold 11 is connected by one or more connectors 13 to a suitable vacuum generator, for example a suction fan.

Nozzle body 10 has a conically running cross section and consists of two nozzle lips 14 and 15, which on the front end form suction orifice 16. To prevent nozzle lips 14, 15 from being pressed together by the action of the pressure difference in the areas with thinning wall thicknesses, spacing flanges 18, which, for example, have a round cross section, are placed between nozzle lips 14, 15.

To increase its flexibility, nozzle body 10 is provided with indentations 19 in its longitudinal direction. Connectors 20 of corrugated hoses 12 are suitably molded into rear wall 21 of nozzle body 10.

Nozzle body 10 is provided on its lower outside surface with a layer 23 with a low coefficient of friction, which promotes the sliding process of the glass surface. Optionally, upper nozzle lip 14 can also be provided with such a sliding layer.

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the United States is:

1. A process for laminating a curved glass sheet with a flexible film, which utilizes a spacer member which comprises:
   bringing the curved glass sheet and the film together at an acute angle and continuously moving the glass sheet and the film together;
   preliminarily bonding the film to the glass sheet by use of pressure along a contact line and by removal of air from between said film and sheet;
   forming a continuously movable hollow space in an area ahead of contact of the film with the glass member by sliding contact of said spacer member, said spacer member comprising an elastically deformable nozzle continuously pressed against said sheet, said nozzle bearing a slot in its terminal end for evacuation of air, said nozzle slot being sufficiently elastic such that, under the effect of the pressure difference produced by the suction action, it adapts to the given shape of the glass sheet, extending crosswise to a direction of movement of the sheet, on the one hand with a surface portion of the glass sheet and, on the other hand, with the film, wherein a hollow space is defined by the film, the glass sheet and the spacer member;

continuously sucking air from said hollow space through said slot in said elastically deformable nozzle; and finally bonding the preliminary bonded film and glass sheet to one another by applying an increased temperature and increased pressure thereto.

2. A process according to claim 1 wherein said flexible film comprises at least one layer of polyurethane.

3. A process for laminating a curved plastic sheet with a flexible film, which utilizes a spacer member which comprises:

bringing the plastic sheet and the film together at an acute angle and continuously moving the plastic sheet and the film together;

preliminarily bonding the film to the curved plastic sheet by use of pressure along a contact line and by removal of air from between said film and sheet;

forming a continuously movable hollow space in an area ahead of contact of the film with the curved plastic sheet by sliding contact of said spacer member, said spacer member comprising an elastically deformable nozzle which is applied against said curved plastic sheet during said sliding contact, said nozzle bearing a slot in its terminal end for the sucking of air, said nozzle being sufficiently deformable such that under the effect of the pressure difference produced by the suction action, said nozzle slot adapts to the given shape of the glass sheet, extending crosswise to a direction of movement of the plastic sheet, on the one hand, with a surface portion of the plastic sheet and, on the other hand, with the film, wherein said hollow space is defined by the film, the plastic sheet and the spacer member;

continuously sucking air from said hollow space through said slot in said elastically deformable nozzle; and finally bonding the preliminary bonded film and curved plastic sheet to one another by applying an increased temperature and increased pressure thereto.

4. A process according to claim 3 wherein said flexible film comprises at least one layer of polyurethane.

* * * * *